United States Patent
Walther

(10) Patent No.: US 7,034,421 B1
(45) Date of Patent: Apr. 25, 2006

(54) DRIVING DEVICE MAINLY INTENDED FOR THE WIPER SYSTEM OF A MOTOR VEHICLES

(75) Inventor: Bernd Walther, Bietigheim-Bissingen (DE)

(73) Assignee: Valeo Wischersysteme GmbH (DE)

( * ) Notice: Subject to any disclaimer, the term of this patent is extended or adjusted under 35 U.S.C. 154(b) by 0 days.

(21) Appl. No.: 09/856,787

(22) PCT Filed: Sep. 10, 1999

(86) PCT No.: PCT/EP99/06683

§ 371 (c)(1),
(2), (4) Date: May 25, 2001

(87) PCT Pub. No.: WO00/31856

PCT Pub. Date: Jun. 2, 2000

(30) Foreign Application Priority Data

Nov. 26, 1998 (DE) .......................................... 198 54 535

(51) Int. Cl.
*H02K 7/10* (2006.01)

(52) U.S. Cl. ........................................... 310/90; 310/83
(58) Field of Classification Search ................... 310/90, 310/83; 74/425, 412; H02K 7/10
See application file for complete search history.

(56) References Cited

U.S. PATENT DOCUMENTS 3,549,218 A 12/1970 Cagnon et al. ............. 308/163
3,848,477 A 11/1974 Giandinoto et al. .......... 74/425
5,027,024 A 6/1991 Slayton ........................ 310/90

FOREIGN PATENT DOCUMENTS

DE 41 16 368 11/1992
DE 196 17 448 11/1997

*Primary Examiner*—Darren Schuberg
*Assistant Examiner*—Karen Addison
(74) *Attorney, Agent, or Firm*—J. Gordon Lewis

(57) ABSTRACT

The invention is a driving device mainly for the windshield wiper assembly of a motor vehicle, which has a housing, an electric motor located in a housing with a pivoted armature, a gear unit located in the housing with a worm shaft located on a section of the armature and an axial force generating device to compensate for the axial free play of the armature. In order to create a driving device of the simplest possible construction in which the axial force generating device does not have to absorb all of the axial forces from the armature and which nevertheless can properly compensate for the axial free play of the armature, one end of the armature is supported by a support bearing at the housing and that the axial force generating device has a tapered sliding member which rides movably in the housing in a radial direction relative to the armature and is supported at the armature so that an axial force running in the direction of the support bearing can be applied to the armature by moving the tapered slide.

20 Claims, 1 Drawing Sheet

DRIVING DEVICE MAINLY INTENDED FOR THE WIPER SYSTEM OF A MOTOR VEHICLES

BACKGROUND

The present invention relates to a driving device, mainly intended for the wiper system of a motor vehicle, which possesses a housing, an electric motor located in the housing with a pivoted armature shaft, a gear unit located in the housing with a worm shaft located on one section of the armature shaft, and an axial force generating device to compensate for the end play in the armature shaft.

The housing of the driving device is subdivided into a section in which the electric motor is located, and a section in which the gear unit is located. The section of the housing in which the electric motor is located will be described henceforth as the motor housing, the section of the housing in which the gear unit is located will be described as the gear housing.

A driving device of this type is known, for example, from German patent application 196 52 929. The driving device revealed there is used mainly to drive a windshield wiper system in a motor vehicle. It possesses an electric motor which is flange-mounted to a gear housing. The electric motor possesses an armature shaft which extends into the gear housing at its free end. The free end of the armature shaft has a worm shaft to drive a worm gear of a gear unit housed in the gear housing.

The sloping flanks of the worm shaft and the worm gear cause an axial force during operation of the driving device, which impinges on the armature shaft. The direction of the axial force depends on the direction of rotation of the armature shaft. At the points where the windshield wiper changes direction, the direction of the axial force on the drive shaft reverses briefly, because the gear unit is being loaded in the opposite direction. Because of manufacturing tolerances for the individual components of the driving device and because of operating wear in the area of the thrust bearings of the drive shaft, the result can be a relatively large end play of the drive shaft in its thrust bearings. The consequence of the end play can be abrupt axial movement of the armature shaft when the windshield wiper reverses direction, which causes irritating noises.

In order to reduce this end play, the armature shaft in the known driving device runs in two roller bearings, on both sides of the worm drive. The roller bearings have an inner race located on the armature shaft and a fixed outer race attached to the gear housing. The inner race of one of the two roller bearings is located such that it can move on the armature shaft. An axial force generating device bears against the inner race and exerts an axial force on the armature shaft relative to the inner race. In the area of the other roller bearing, a fixed thrust washer is mounted to the armature shaft. The inner race of the other roller bearing is supported against the armature shaft through the thrust washer in such a way that it transmits the axial thrust acting on the armature shaft to the inner race of the other roller bearing. In this way the armature shaft is positioned between the roller bearings in the axial direction. The positioning forces are passed into the gear housing through the roller bearings. This positions the armature shaft in the axial direction relative to the gear housing.

The axial force generating device possesses a spring element which bears against the armature shaft at one end and at the other end against the inner race of one of the roller bearings. The spring element of the axial force generating device has to absorb all of the axial forces from the armature shaft being generated in the direction of the gear unit while the driving device is operating. Moreover, this known driving device requires the use of at least two roller bearings, between which the armature shaft can be kept positioned.

The task of the present invention is to continue the development and design of the driving device of the prior type described above such that it is constructed in the simplest way, that the axial force generating device does not have to absorb all the axial forces from the armature shaft and that it can still fully compensate for the end play of the armature shaft.

SUMMARY

In order to fulfill this task, the invention proposes, starting with the driving device of the prior type described above, that one end of the armature shaft is supported via a support bearing against the housing and that the axial force generating device has a tapered sliding member which can move in the housing in a radial direction relative to the armature shaft and is supported on the armature shaft so that an axial force can be applied to the armature shaft in the direction of the support bearing by moving the tapered sliding member.

In the driving device according to the invention, the armature shaft can be supported against the support bearing through the gear housing or the motor housing. Depending on which method is chosen, the support bearing is located either in the motor housing or in the gear housing. The tapered sliding member is always located and formed in such a way that it applies an axial force to the armature shaft in the direction of the support bearing.

The driving device according to the invention is simple in construction. The axial force generating device for the driving device does not have to absorb all the entire axial forces from the armature shaft. The slope of the tapered sliding member can be selected such that the axial forces affecting the armature shaft are converted by the tapered sliding member into substantially smaller displacement forces in a radial direction. In addition, the driving device according to the invention can fully compensate for the end play of the armature shaft.

In accordance with an advantageous development of the invention, the armature shaft is supported in a roller bearing with an inner race located on the armature shaft and an outer race located in the housing. Only the driving device in accordance with the invention allows the end play of the armature shaft to be fully compensated for if only one roller bearing is used. The driving device can consequently be made with fewer moving parts. That results in higher availability and in lower manufacturing costs for the driving device according to the invention. The roller bearing is advantageously located between the worm gear and the electric motor.

In accordance with another preferred development of the present invention, it is proposed that the outer race is supported in the housing axially movable and that the tapered sliding member applies an axial force to the outer race in the direction of the support bearing.

The fixed inner race is advantageously located on the armature shaft, so that it can transfer axial force affecting the outer race to the armature shaft. The inner race is, for example, attached by means of a press fit on the armature shaft. The axial force from the axial force generating device affecting the outer race of the roller bearing in the direction of the support bearing can thus be transferred over the roller bearing to the armature shaft. The armature shaft is thereby positioned in the housing in the axial direction between the axial force generating device and the support bearing without any resulting deleterious effect on the rotational properties of the armature shaft.

In accordance with a preferred embodiment, a fixed thrust washer is located on the armature shaft on the side of the roller bearing facing away from the tapered sliding member. The thrust washer is located on the side of the roller bearing facing the support bearing. The inner race of the roller bearing can be supported against the thrust washer. As a result, the axial force affecting the roller bearing can be fully transferred by the inner race to the armature shaft.

The thrust washer is preferably formed as a clamp ring, which is located on the armature shaft in an annular groove on the armature shaft. A thrust washer formed in this way can be installed easily and is secured against axial displacement on the armature shaft.

In accordance with a particularly preferred development of the invention, the tapered sliding member is basically U-shaped, where the armature runs in the gap between the two parallel legs of the U. In this way it is ensured that in the area of the two legs the tapered sliding member acts on the outer race symmetrically and applies equal axial force to it in the direction of the support bearing.

In accordance with an advantageous embodiment, it is proposed that the housing has a collar-shaped area which extends radially inwards, through which the armature passes and on which the tapered sliding member is supported. The tapered sliding member can be supported against the housing over a large surface in this area.

The surface of the collar-shaped area against which the tapered slider is supported, possesses advantageously a bevel which matches the bevel on the surface of the tapered sliding member by which the latter is supported in the collar-shaped area. The surface of the tapered sliding member, which is supported on the outer bearing race, runs perpendicular to the armature and thus lies against the outer bearing race over a large area. By displacing the tapered sliding member in a radial direction relative to the armature, the tapered sliding member slides along the bevel of the collar-shaped area. As a result, the tapered sliding member is forced to move in an axial direction, in addition to its sliding radial movement. As a result of this movement of the tapered sliding member in an axial direction, an axial force is imparted to the outer race in the direction of the support bearing.

It is conceivable for a displacement force to be imparted to the tapered sliding member by means of a threaded element or other manual means of adjustment. In this way, a desired displacement force, and thus a desired axial force as well, could be permanently set during production of the driving device, for example. However, the end play of the armature can increase with time as the result of operating wear of the axial bearing elements of the input shaft or of the support bearing. In that case the displacement force acting on the tapered sliding member would have to be reset using manual methods of adjustment. For this reason, an automatic self-adjusting axial force generating device is particularly advantageous. So the invention proposes in accordance with a particularly preferred embodiment that a displacement force is applied to the tapered sliding member by means of a spring element.

The spring element is preferably formed as a coil spring. Alternatively, it is proposed that the spring element is formed as a leaf spring. By designing a very stiff leaf spring, the tapered sliding member can be subjected to particularly high displacement forces. The spring element consists preferably of rubber or plastic.

In accordance with a particularly preferred embodiment of the present invention, it is proposed that the armature is mounted pivotably in the gear housing and that similarly the support bearing is located in the gear housing. In this way the armature can be securely held between two points in the part of the housing for the driving device in which the gear unit is located.

BRIEF DESCRIPTION OF THE DRAWING

A preferred embodiment of the present invention is explained in greater detail below using the drawings in which.

DETAILED DESCRIPTION

Figure 1:
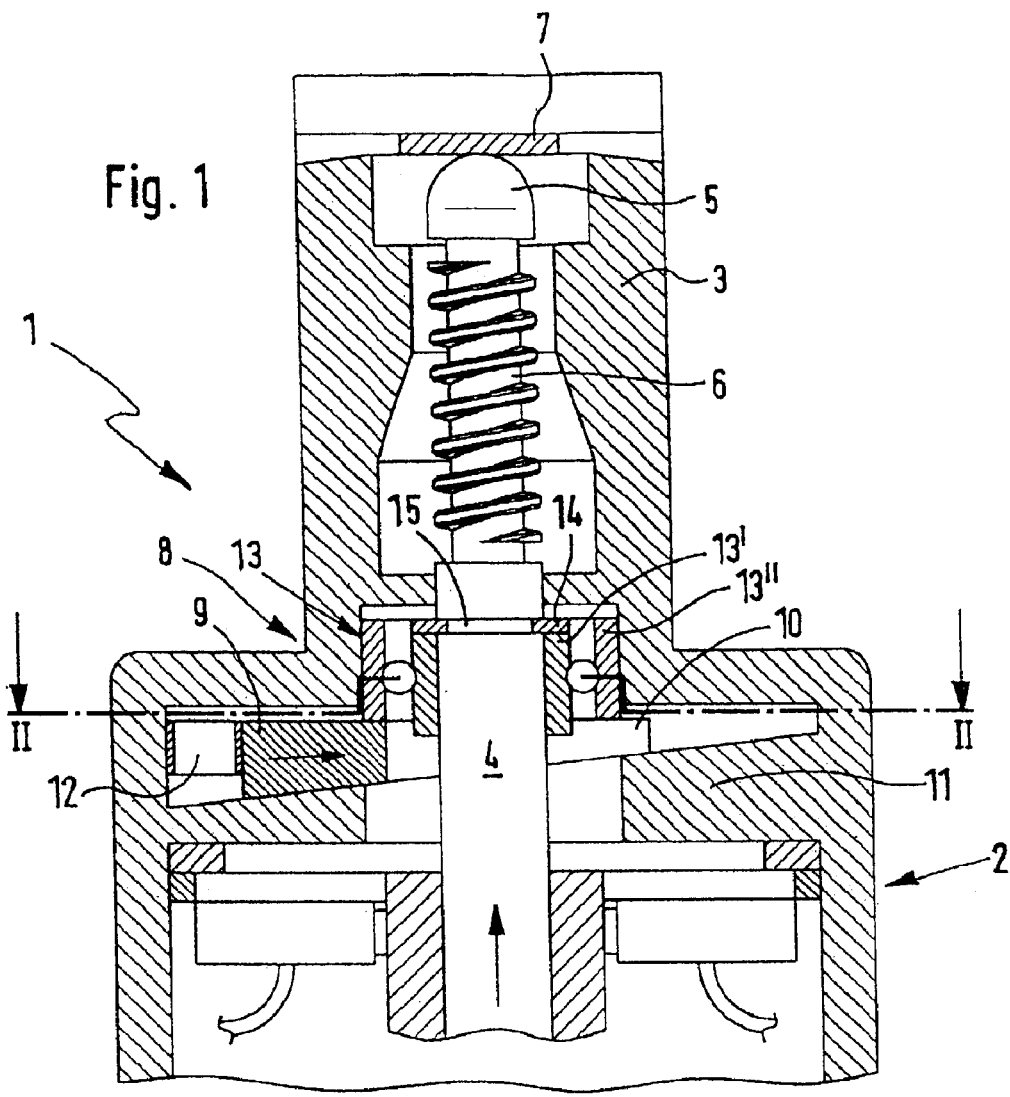
FIG. 1 depicts a driving device according to the invention in a side view and partially in section.

In FIG. 1 a driving device in accordance with the invention is identified in its entirety with reference numeral 1. The driving device 1 is used, for example, as the drive of a windshield wiper system in a motor vehicle. It possesses a housing 3 in which an electric motor 2 is located. The electric motor 2 is housed in a part of the housing 3 described as the motor housing. The electric motor 2 is flange-mounted to a part of the housing 3 described as the gear housing. The electric motor 2 possesses an armature 4, which extends into the gear housing with its free end 5. The armature 4 has a worm drive 6 on its free end to drive a worm gear (not shown) on a gear unit (not shown) housed in the gear housing 3.

During operation of the driving device 1, the sloping flanks of the worm drive 6 and of the worm gear result in an axial force acting on the armature. The direction of the axial force is dependent on the direction of rotation of the armature 4. At the points where the windshield wiper switches direction, the direction of the axial force on the drive shaft 4 reverses briefly, because the gear unit is under load in the opposite direction. Because of manufacturing tolerances in the individual components of the driving device 1 resulting from operating wear of the thrust bearing elements of the drive shaft 4, the result can be relatively large end play of the axial shaft 4 in its thrust bearings. As a result of the end play, a reversal of direction can cause abrupt axial movement of the armature, which causes irritating noises.

In order to compensate for the end play of the armature 4, it is proposed in the case of the driving device 1 according to the invention that the free end 5 of the armature 4 is supported against the housing 3 by means of a support bearing 7. The driving device 1 additionally possesses an axial force generating device 8, which applies an axial force to the armature 4 generated in the direction of the support bearing 7. The axial force generating device 8 has a tapered sliding member 9, which is supported movably in the radial direction relative to the armature 4 and is supported at the armature 4, so that axial force in the direction of the support bearing 7 can be applied to the armature 4 as a result of moving the tapered sliding member 9. To do this, a displacement force in the direction of the tip 10 of the tapered sliding member 9 is applied to the tapered sliding member 9. The housing 3 possesses a collar-shaped area 11 extending radially inward, through which the armature 4 passes and on which the tapered sliding member 9 is supported. The surface of the collar-shaped area 11 possesses a bevel which matches the bevel on the surface of the tapered sliding member 9, and against which the latter is supported on the collar-shaped area 11.

Figure 2:
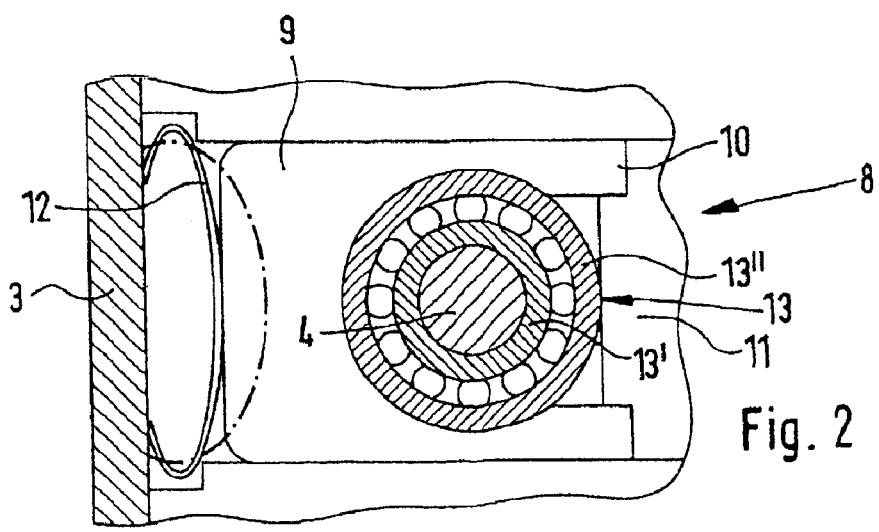
FIG. 2 shows the driving device from FIG. 1 in a plan view, partially in section.

The tapered sliding member 9 in the plan view (see FIG. 2) is essentially U-shaped in construction. The armature 4 runs in the gap between the two parallel legs of the U. The displacement force is applied to the tapered sliding member 9 by means of a spring element 12.

The armature 4 rides in a roller bearing 13. The roller bearing 13 possesses an inner race 13' located on the armature 4 and an outer race 13" located in the housing 3. The roller bearing is located between the worm drive 6 and the electric motor 2. The outer race 13" is axially movably mounted in the housing 3. The tapered sliding member 9 imparts an axial force in the direction of the support bearing 7 to the outer race 13". The fixed inner race is mounted on the armature 4 so that it can transfer an axial force imparted in the direction of the support bearing 7 to the armature 4. In this way, the axial thrust of the tapered sliding member 9 is transferred over the roller bearing 13 to the armature 4. A fixed thrust washer 14 is mounted on the armature 4 on the side of the roller bearing 13 facing away from the tapered sliding member 9. The thrust washer 14 is constructed as a clamp ring which is located on the armature 4 in an annular groove 15 in the armature 4.

What is claimed is:

1. A driving device for a windshield wiper assembly of a motor vehicle comprising:
    a housing;
    an electric motor located in the housing connected with a rotating armature shaft having a first end portion and a second end portion;
    a gear unit located in the housing with a worm located on an intermediate portion of the armature shaft;
    a support bearing supporting one end of the armature shaft at the housing; and
    an axial thrust generating device located on an opposite end of the armature shaft from the support bearing and possessing a tapered sliding member supported in the housing for movement in the radial direction relative to the armature shaft and supported against the armature shaft so that axial force can be applied to the armature shaft in the direction of the support bearing by moving the tapered sliding member, wherein the armature shaft is supported in a roller bearing with an inner race located on the armature shaft and an outer race located in one of a gear housing and in the motor housing.

2. The driving device in accordance with claim 1, wherein the roller bearing is located between the worm and the electric motor.

3. The driving device in accordance with claim 1 wherein the outer race is supported in the housing to be movable axially and wherein the tapered sliding member imparts an axial force to the outer race in the direction of the support bearing.

4. The driving device in accordance with claim 3 wherein the fixed inner race is attached to the armature shaft to transfer an axial force acting on the outer race to the armature shaft.

5. The driving device in accordance with claim 4 wherein a fixed thrust washer is located on the armature on the side of the roller bearing facing away from the tapered sliding member, the thrust washer contacting the inner race.

6. The driving device in accordance with claim 5 wherein the thrust washer is formed as a clamp ring located on the armature shaft in an annular groove formed in the armature shaft.

7. The driving device in accordance with claim 1, wherein the tapered sliding member is formed basically U-shaped, where the armature shaft runs in the gap between two parallel legs defined by the U-shaped tapered sliding member.

8. The driving device in accordance with claim 1, wherein the housing possesses a collar-shaped area extending radially inward, the armature shaft running through the collar-shaped area and the tapered sliding member is supported on the collar-shaped area of the housing.

9. The driving device in accordance with claim 8 wherein the surface of the collar-shaped area supporting the tapered sliding member having a bevel matching a bevel on a surface of the tapered sliding member, the bevel on the surface of the tapered sliding member being supported in the collar-shaped area.

10. A driving device for a windshield wiper assembly of a motor vehicle comprising:
    a housing;
    an electric motor located in the housing connected with a rotating armature shaft having a first end portion and a second end portion;
    a gear unit located in the housing with a worm located on an intermediate portion of the armature shaft;
    a support bearing supporting one end of the armature shaft at the housing; and
    an axial thrust generating device located on an opposite end of the armature shaft from the support bearing and possessing a tapered sliding member supported in the housing for movement in the radial direction relative to the armature shaft and supported against the armature shaft so that axial force can be applied to the armature shaft in the direction of the support bearing by moving the tapered sliding member, wherein a displacing force can be applied to the tapered sliding member by means of a spring element.

11. The driving device in accordance with claim 10 wherein the spring element is constructed as a helical spring.

12. The driving device in accordance with claim 10 wherein the spring element is constructed as a leaf spring.

13. The driving device in accordance with claim 10 wherein the spring element is constructed as a rubber spring.

14. The driving device in accordance with claim 10 wherein the spring element is constructed as a plastic spring.

15. A driving device for a windshield wiper assembly of a motor vehicle comprising:
    a rotating armature having an outwardly extending shaft with first and second end portions external of the armature;
    a support bearing located on the first end portion of the shaft;
    a roller bearing mechanism operably connected to the second end portion of the shaft, the roller bearing mechanism having a rotatable inner race operably connected to the shaft on one side, an outer stationary race, and a plurality of ball bearings positioned between the inner and outer races; and
    an axial thrust generating device having a tapered sliding member supported for movement in a radial direction relative to the shaft and supported at an opposite end of the shaft from the support bearing so that axial force can be applied to the shaft through the roller bearing mechanism in the direction of the support bearing by moving the tapered sliding member radially.

16. The driving device of claim 15, wherein the support bearing is a rounded surface integrally formed on the first end of the shaft.

17. The driving device of claim 15, wherein the support bearing is a single ball bearing operably engaged with the first end of the shaft.

18. The driving device of claim 15, wherein the tapered sliding member is biased radially inward relative to the shaft with a biasing member.

19. The driving device of claim 15 further comprising:

a worm gear supported on the shaft between the exposed first and second end portions, the roller bearing located between the worm gear and the armature and the support bearing located on an outer end of the shaft.

20. The driving device in accordance with claim 10, wherein the armature shaft is supported in a roller bearing with an inner race located on the armature shaft and an outer race located in one of a gear housing and in the motor housing.

* * * * *